United States Patent [19]

Plum et al.

[11] Patent Number: 4,734,520

[45] Date of Patent: Mar. 29, 1988

[54] PROCESS FOR PRODUCING CROSSLINKING COMPONENTS FOR PAINT BINDERS AND TO THE CROSSLINKING COMPONENTS

[75] Inventors: Helmut Plum, Taunusstein, Fed. Rep. of Germany; Willibald Paar, Graz, Austria

[73] Assignee: Vianova Kunstharz, A.G., Werndorf, Austria

[21] Appl. No.: 867,960

[22] Filed: May 29, 1986

[30] Foreign Application Priority Data

May 29, 1985 [AT] Austria ................................ 1602/85

[51] Int. Cl.$^4$ ........................................ C07C 125/065
[52] U.S. Cl. ................................... 560/115; 558/392; 558/430; 558/443; 560/24; 560/34; 560/125; 560/159; 560/169
[58] Field of Search ................... 560/115, 24, 34, 125, 560/159, 169; 558/392, 430, 443

[56] References Cited

U.S. PATENT DOCUMENTS 4,165,329  8/1979  Dreher ................................ 560/34

Primary Examiner—Michael L. Shippen

Attorney, Agent, or Firm—A. W. Breiner

[57] ABSTRACT

Crosslinking components for hydroxy and/or primary and/or secondary amino group containing paint binders for the crosslinking of synthetic resins carrying at least two groups capable of ester or amide formation with carboxylic acids. In particular there is disclosed the use of the crosslinking components in compositions for electrodeposition (ED) whereby at 120° C. and above coatings with extraordinary paint performance are obtained. The use of methyl or ethyl esters gives extremely low condensation losses. The crosslinking components are obtained through reaction of one mole of a diisocyanate, preferably at room temperature, in the presence of sodium, or preferably sodium phenolate, as catalyst, with at least one mole of a CH-active alkyl ester of the general formula X—$CH_2$—COOR, wherein X is —COOR, —CN or $CH_3$—CO— and R is an alkyl radical with 1 to 8 C-atoms and subsequent reaction of the free isocyanate groups with polyamines of the general formula $H_2N$—(R—NH)$_n$—R—$NH_2$, wherein n is 0 to 3 and/or (poly)aminoalcohols of the formula $N_2H$—(R—NH)$_n$—R—OH, wherein n is 0 to 3, or HO—(R—NH)$_n$—R—OH, wherein n is 1 to 3, and R is an alkylene radical in all cases.

6 Claims, No Drawings

PROCESS FOR PRODUCING CROSSLINKING COMPONENTS FOR PAINT BINDERS AND TO THE CROSSLINKING COMPONENTS

This invention is directed to a process for producing crosslinking components for paint binders carrying hydroxy groups and/or primary and/or secondary amino groups; to the crosslinking components produced according to the invention, and to the use of such crosslinking components for curing synthetic resins which carry at least two functional groups capable of forming esters and/or amides with carboxylic acids. In particular, the invention is directed to the use of the crosslinking components in compositions for electrodeposition (ED).

BACKGROUND OF INVENTION AND PRIOR ART

Two-component paints with good storage stability of polymers capable of forming amides or urethanes and blocked isocyanates are disclosed in U.S. Pat. No. 2,995,531. Further, according to DE-OS No. 20 57 799 such combinations may also be used for the formulation of cathodically depositable ED-paints. One-component systems in which a partially blocked polyisocyanate is linked to a polymer via a urethane grouping are disclosed in DE-OS No. 20 20 905 and DE-OS No. 22 52 536. Systems of this type have the disadvantages of requiring relatively high stoving temperatures and of significant losses of binder material on stoving. Low alkanols such as methanol or ethanol cannot be used as blocking agents. Also, the systems known from EP No. B1-0012463, including amino polyester polyols and $\beta$-hydroxyalkylesters which cure through transesterification, require high stoving temperatures and have substantial losses on stoving.

It is further known from EP No.-B1-00 82 291 to use mixed esters of malonic acid, for example trimethylolpropanetriethylmalonate, as a crosslinker for basic resins capable of amide or ester formation. These crosslinkers have relatively low losses on stoving, and the product split-off is non-toxic ethanol. However, in aqueous systems for cathodic electrodeposition, these crosslinkers show defects with respect to stability to hydrolysis, and thus it is difficult to keep constant the pH-value and the MEQ-value of an electrodeposition bath.

DE-OS No. 33 15 569 discloses as crosslinkers for cathodic electrodeposition MICHAEL-addition products produced from CH-active mono- or dicarboxylic acid esters. These compounds cure at a minimum stoving temperature of 140° to 160° C. in the presence of catalysts, such as the lead salts.

It is known from Petersen, Taube; *Liebigs Ann. Chem.*, 562, (1949) 205, that compounds formed from isocyanates and dialkylmalonates can be produced with a methanetricarboxylic acid dialkylester monoamide structure unit which will cross-link with polyols at temperatures of from about 130° C. upwards in the presence of sodium and sodium alcoholates. This reaction has widely been used for the preparation of crosslinking components for liquid stoving paints or stoving paints dissolved in organic solvents. Thus, DE-OS No. 23 42 603 describes a process for producing dialkylestermalonate-blocked biuretpolyisocyanates. In this process, at first, in a rather complicated manner, a two-step reaction is carried out (preparation of a mixture of biuretpolyisocyanate and a monomeric diisocyanate and subsequent separation of the monomeric diisocyanate) to obtain a monomer-free biuretpolyisocyanate which is then reacted with a dialkylmalonate. A stoichiometric excess of dialkylmalonate is preferred. Thus, the reaction mixture contains unreacted dialkylmalonate which does not participate in the crosslinking reaction and may adversely influence the film performance.

A specially blocked isocyanate obtained by reaction of 3-isocyanatomethyl-3,5,5-trimethylcyclohexylisocyanate and two moles of dialkylestermalonate is described in DE-OS No. 24 36 877. DE-OS No. 25 50 156 discloses a process for polyisocyanate mixtures with blocked isocyanate groups easily soluble in paint solvents, where the 3-isocyanatomethyl-3,5,5-trimethylcyclohexylisocyanate is partially reacted with a polyol prior to the reaction with the CH-active blocking agent. DE-OS No. 27 23 117 describes the coemployment of malonate "blocked" diisocyanates in the formulation of stoving paints of aminoplast resins and polyols. The presence of the aminoplast resin is necessary to obtain a film with satisfactory hardness.

The "blocked" polyisocyanates described in DE-OSS Nos. 23 42 603, 24 36 877, and 25 50 156 may, in general, also be used for ED-compositions if they are combined with synthetic resins which are water-dilutable on partial neutralization with acids. At low stoving temperatures, for example 140° C, however, the coatings show unsatisfactory hardness and solvent resistance. The co-employment of aminoplast resins, as described in DE-OS No. 27 23 117, are of no value. It appears that the catalysts necessary for the curing of the aminoplast resins, i.e., sulfonic acid, are neutralized and thus become ineffective.

OBJECTS AND GENERAL DESCRIPTION OF INVENTION

It is a primary object of the present invention to provide a crosslinking component which crosslinks at the lowest temperature possible with hydroxy and/or amino group containing cationic resins which are water-dilutable upon at least partial protonation. The crosslinking component must be sufficiently stable in cationic paint systems so as to provide an acceptable product. On curing, only low quantities of polluting substances are to be split-off.

It has now been found that reaction products of CH-active alkyl esters, diisocyanates and polyamines and/or polyaminoalcohols in combination with hydroxy and/or amino group containing resins give coatings with superior performance at stoving temperatures of from 120° C. upwards. If the CH-active alkyl esters are methyl and ethyl esters, the losses split-off on curing are especially low. The split-off products of ethyl esters are not detrimental from the pollution standpoint. The crosslinking components are stable over long periods in cationic ED-systems.

Thus, the present invention is directed to a process for producing crosslinking components for hydroxy and/or primary and/or secondary amino group containing paint binders, characterized in that in a first step one mole of a diisocyanate is reacted, preferably at room temperature, in the presence of 0.1 to 0.5% by weight (b.w.), calculated on the total weight of the reaction mass, of sodium, or preferably sodium phenolate, as catalyst, with at least one mole of a CH-active alkyl ester of the general formula X—CH$_2$—COOR, wherein X is COOR, —CN or CH$_3$—CO— and R is an alkyl radical with 1 to 8 C-atoms, and the free isocyanate groups of the reaction product are reacted in a second step with polyamines of the formula $H_2N-(R-NH)_n-R-NH_2$, wherein n is 0 to 3, and/or polyaminoalcohols of the formula $H_2N-(R-NH)_n-R-OH$, wherein n is 0 to 3, or $HO-(R-NH)_n-R-OH$, wherein n is 1 to 3, and R is an alkylene radical in all cases.

The invention is further concerned with the products produced according to the process of the invention as well as with their use as a crosslinking component for curing polymers, particularly compositions for an ED-process.

The crosslinking components produced according to the invention react with hydroxy and/or amino group containing polymers at temperatures of from about 120° C. upwards through transesterification or transamidation. The product split-off was found to be only the alcohol from the CH-active alkyl ester. There is no evidence of splitting off of the CH-active alkyl ester, setting free the isocyanate group, with subsequent crosslinking via the formation of urethane or urea groups. This reaction mechanism is known from recent investigations into the addition products of diethylestermalonate and cyclohexyldiisocyanate; Wicks, Kostyck; *J. Coat. Techn.*, 49 (1977) 77.

The products produced according to the invention surprisingly are readily dilutable with conventional paint solvents despite the high content of urea groups. The products exhibit good stability to hydrolysis and are, thus, ideally suited as an ingredient for water-soluble paints, particularly for cathodic ED-compositions.

The diisocyanates preferred for the production of the crosslinking components of the invention are those wherein the isocyanate groups on the compound have a different reactivity, for example, 3-isocyanatomethyl-3,5,5-trimethylcyclohexylisocyanate (IPDI) or 2,4-diisocyanotoluol.

The CH-active alkyl ester compounds useful according to this invention are of the general formula $X-CH_2-COOR$ wherein X is $-COOR$, $-CN$ or $CH_3-CO-$ and R is an alkyl radical with 1 to 8 C-atoms. Preferably dimethylestermalonate or diethylestermalonate is used.

The polyamines used according to the invention correspond to the general formula $H_2N-(R-NH)_n-R-NH_2$, wherein n is 0 to 3 and R is an alkylene radical. Representatives of this group are the alkylene diamines, such as ethylenediamines and its homologues or polyalkylene polyamines, such as diethylene triamine, triethylene tetramine or tetrapropylene pentamine. Suitable (poly)amino alcohols correspond to the formula $H_2N-(R-NH)_n-R-OH$ (n=0-3) or $OH-(R-NH)_n-R-OH$ (n=1-3). Particularly suited representatives of this group are hydroxyethyldiethylene triamine or bis-hydroxyethyldiethylene triamine.

The reaction between the diisocyanate and the CH-active alkyl ester is preferably carried out in the presence of solvents not containing active hydrogen atoms, for example, ethyl acetate, butyl acetate, toluol, methylethylketone, methyl ethyl ketone, ethylene glycol dimethyl ether, and the like. The reaction can also be carried out in the absence of solvents. Preferably the reaction is carried out under the protection of nitrogen with the exclusion of moisture. Sodium or preferably sodium phenolate, is utilized as a catalyst, at a level of from 0.1 to 0.5% b.w., calculated on the total weight of the reaction components. The diisocyanate and CH-active alkyl ester are used in quantities such that per isocyanate group at least one mole, preferably 1.1–1.5 moles, of CH-active ester are present. The excess of CH-active alkyl ester provided is intended to keep the content of unreacted diisocyanate at the lowest possible level.

The reaction is conducted in order that the isocyanate, optionally together with the solvent, is charged to the reaction vessel and the CH-active ester and the catalyst, preferably at room temperature, are continuously added within from 30 minutes to 10 hours. As soon as the isocyanate content of the reaction mixture has fallen to a value whereby theoretically the total CH-active alkyl ester has reacted in a mole ratio of 1:1 with the isocyanate groups, the batch is immediately reacted with the polyamine and/or (poly)aminoalcohol. The addition product and the polyamine and/or (poly)aminoalcohol are utilized in quantities whereby for each isocyanate group one primary or secondary amino group or hydroxy group is used.

The polyamine and/or (poly)aminoalcohol is charged to the reaction vessel together with one of the above-mentioned aprotic solvents, and the addition product of the first reaction step is added at a controlled rate so that the reaction temperature does not surpass 100° C., preferably 60° C. Subsequently the reaction blend is held at 60° C. until the isocyanate content has fallen to below 0.5% b.w. Depending on the quantity of reaction mass, the reaction is finished after from about 1 to 5 hours.

The crosslinking components of the invention can be used in two-component systems together with a synthetic component capable of amide or ester formation. Examples of such components are polymers of ethylenically unsaturated monomers containing hydroxy esters of ethylenically unsaturated carboxylic acids, such as hydroxyalkyl acrylates or aminoalkyl acrylates. Another suitable group are the polyaminopolyamides obtainable from the dimerized fatty acids and polyamines or, for example, aminopolyether polyols obtained in a reaction of epoxy resins with primary or secondary amines. Aminopolyether polyols are particularly suited for the formulation of cationic ED-compositions.

The ratio of resin to crosslinking components is governed by the desired degree of crosslinking and ranges, in general between about 0.2 and 2 ester groups in the crosslinking component for one hydroxyl or primary or secondary amino group in the polymer. For accelerating the transesterification or transamidation, the known catalysts can be added, such as the metal salts of organic acids such as zinc, lead, iron, copper, chromium, cobalt acetate or octoate or naphthenate.

The formulation of the paints and their processing by the normal application methods, particularly the ED-process, are known to one skilled in the art and are described in the literature.

The following examples illustrate the invention without limiting its scope. Parts and percentages, unless otherwise stated, are parts or percentages by weight.

EXAMPLE 1

(a) Preparation of the Crosslinking Component 176 g of diethylestermalonate and 0.8 g sodium phenolate are continuously added within 8 hours to a blend of 222 g 3-isocyanatomethyl-3,5,5-trimethylcyclohexylisocyanate and 176 g diethyleneglycol dimethylether. The blend is allowed to react at room temperature until the isocyanate content has reached about 6.6%. The batch is then added to a blend of 30.9 g diethylene triamine and 220 g diethyleneglycol dimethylether at a rate such that the reaction temperature does not surpass 30° C. Then the batch is held at 60° C. until the isocyanate content has fallen to below 0.1%.

(b) Preparation of the Binder

According to known methods, an aminopolyether polyol is prepared from
65.5% of a bisphenol A epoxy resin ester with an epoxy equivalent weight of 480;
18.8% of a polyester of trimethylolpropane, adipic acid, isononanoic acid and tetrahydrophthalic anhydride; the polyester had an acid value of 65 mg KOH/g and a hydroxyl value of 310 mg KOH/g;
6.1% diethanolamine;
4.4% 2-ethylhexylamine; and
5.2% diethylaminopropylamine.
The product is dissolved in propyleneglycol monomethylether to 65% solids. The product has an amine value of 96 mg KOH/g.

(c) Electrodeposition and Evaluation.

108 g binder 1(b) are mixed with 60 g crosslinking component 1(a) and 15 g 3N formic acid and diluted with 817 g deionized water. The paint bath is stirred for 24 hours and has the following specification:
Solids Content: 10% b.w.
pH-value: 5.7
Conductivity: 1060 $\mu Scm^{-1}$
MEQ-value: 38

On a phosphated steel panel, wired as the cathode, a film is deposited at 25° C. bath temperature for 1 minute at 150 V and cured for 30 minutes at 120° C. to give a smooth coating with a thickness of 15 $\mu$m and a solvent resistance of over 500 double rubs with methylisobutylketone.

EXAMPLE 2

(a) Preparation of an Aminoalcohol 204 g 4-methyl-1,3-dioxolane-2-one are added in drops to a blend of 189 g tetraethylene pentamine and 168 g diethyleneglycol dimethylether at such a rate as to not surpass a reaction temperature of 60° C. Subsequently, the temperature is held at 60° C. until an amine value of 300 mg KOH/g is attained.

(b) Preparation of the Crosslinking Component 176 g diethylestermalonate and 0.8 g sodium phenolate are added continuously within 8 hours at room temperature to a blend of 222 g 3-isocyanatomethyl-3,5,5-trimethylcyclohexylisocyanate and 176 g diethyleneglycol dimethylether. The batch is allowed to react at room temperature until the isocyanate content has reached 6.6%. This mixture is added to a mixture of 101 g of the 70% solution of aminoalcohol 2(a) and 0.5 g dibutyl tin dilaurate at a rate so as to not surpass a reaction temperature of 40° C. Subsequently, the temperature is held at 60° C. until the isocyanate content has fallen below 0.1% b.w.

(c) Electrodeposition and Evaluation 108 g binder 1(b) are mixed with 43 g crosslinking component 2(b) and 15 g 3N formic acid and diluted with 834 g deionized water. The paint bath is stirred for 24 hours and has the following specification:
Solids Content: 10% b.w.
pH-value: 5.8
Conductivity: 1060 $\mu Scm^{-1}$
MEQ-value: 45

On a phosphated steel panel, wired as the cathode, a film is deposited at 25° C. bath temperature for 1 minute at 150 V and cured for 30 minutes at 120° C. to give a smooth coating with a film thickness of 23 $\mu$m and a solvent resistance of over 500 double rubs with methylisobutylketone.

COMPARISON EXAMPLE 108 g aminopolyetherpolyol 1(b) are mixed with 43 g of a reaction product prepared according to DE-OS No. 25 50 156 of diethylestermalonate, trimethylolpropane and 3-isocyanato-3, 5,5-trimethylcyclohexylisocyanate (70% in diethyleneglycol dimethylether) and 11.7 g 3N formic acid and diluted with 37 g deionized water. The paint bath is stirred for 24 hours and has the following specification:
Solids Content: 10% b.w.
pH-value: 5.8
Conductivity: 980 $\mu Scm^{-1}$
MEQ-value: 37

On a phosphated steel panel, wired as the cathode, a film is deposited at 25° C. bath temperature for 1 minute at 150 V and cured for 30 minutes at 140° C. to give a smooth coating with a film thickness of 19 $\mu$m and a solvent resistance of less than 200 double rubs with methylisobutylketone.

As will be apparent to one skilled in the art, various modifications can be made within the scope of the aforesaid description. Such modifications being within the ability of one skilled in the art form a part of the present invention and are embraced by the appended claims.

It is claimed:

1. Crosslinking components for crosslinking paint binders containing reactive hydroxy or primary or secondary amino groups comprising the reaction product of a first processing step wherein 1 mole of a diisocyanate is reacted in the presence of 0.1 to 0.5% b.w., calculated on the total weight of the reaction mass, of a sodium catalyst, with at least 1 mole of a CH-active alkyl ester of the general formula X—CH$_2$—COOR, wherein X is —COOR, —CN or CH$_3$—CO— and R is an alkyl radical of from 1 to 8 C-atoms; and of a second processing step wherein the free isocyanate groups of the reaction product of said first processing step are reacted with polyamines of the formula H$_2$N—(R—NH)$_n$—R—NH$_2$, wherein n is 0 to 3, or polyaminoalcohols of the formula H$_2$N—(R—NH)$_n$—R—OH, wherein n is 0 to 3, or HO—(R—NH)$_n$—R—OH, wherein n is 1 to 3, and R is an alkylene radical in all cases.

2. Crosslinking components according to claim 1 wherein said sodium catalyst is sodium phenolate.

3. Crosslinking components according to claim 1 wherein the reaction with the diisocyanate is carried out in the presence of an aprotic solvent.

4. Crosslinking components according to claim 1 wherein the diisocyanate is a compound wherein the reactive isocyanate groups react at different rates.

5. Crosslinking components according to claim 4 wherein the diisocyanate is 3-isocyanatomethyl-3,5,5-trimethylcyclohexylisocyanate.

6. Crosslinking components according to claim 1 wherein the CH-active alkyl ester is the methyl or ethyl ester of malonic acid.

* * * * *